(12) United States Patent
Wang et al.

(10) Patent No.: US 11,259,312 B2
(45) Date of Patent: Feb. 22, 2022

(54) FACILITATING A TIME-DIVISION MULTIPLEXING PATTERN-BASED SOLUTION FOR A DUAL-SUBSCRIBER IDENTITY MODULE WITH SINGLE RADIO IN ADVANCED NETWORKS

(71) Applicant: AT&T Intellectual Property I, L.P., Atlanta, GA (US)

(72) Inventors: Xiaoyi Wang, Austin, TX (US); Ralf Bendlin, Cedar Park, TX (US); Thomas Novlan, Cedar Park, TX (US); Milap Majmundar, Austin, TX (US); Arunabha Ghosh, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 171 days.

(21) Appl. No.: 16/795,817

(22) Filed: Feb. 20, 2020

(65) Prior Publication Data
US 2021/0105791 A1 Apr. 8, 2021

Related U.S. Application Data

(60) Provisional application No. 62/910,672, filed on Oct. 4, 2019.

(51) Int. Cl.
*H04W 72/12* (2009.01)
*H04L 5/00* (2006.01)
*H04W 72/04* (2009.01)

(52) U.S. Cl.
CPC .......... *H04W 72/12* (2013.01); *H04L 5/0048* (2013.01); *H04W 72/042* (2013.01)

(58) Field of Classification Search
CPC .... H04W 72/12; H04W 72/042; H04L 5/0048
USPC ....................................................... 370/336
See application file for complete search history.

*Primary Examiner* — Angel T Brockman
(74) *Attorney, Agent, or Firm* — Amin, Turocy & Watson, LLP

(57) ABSTRACT

Facilitating a time-division multiplexing pattern-based solution for a dual-subscriber identity module with a single radio in advanced networks (e.g., 5G, 6G, and beyond) is provided herein. Operations of a method can comprise obtaining, by a network device comprising a processor, multiple time-division multiplexing patterns applicable to a mobile device. The multiple time-division multiplexing patterns indicate respective repeating patterns of an on state and an off state of a defined identity of the mobile device. The method also can comprise facilitating, by the network device, a transmission, to the mobile device, of information indicative of the multiple time-division multiplexing patterns. In an example, the mobile device can be configured to operate with at least two subscriber identity modules.

20 Claims, 11 Drawing Sheets

FACILITATING A TIME-DIVISION MULTIPLEXING PATTERN-BASED SOLUTION FOR A DUAL-SUBSCRIBER IDENTITY MODULE WITH SINGLE RADIO IN ADVANCED NETWORKS

CROSS-REFERENCE TO RELATED APPLICATIONS

This application claims the benefit of priority to U.S. Provisional Application No. 62/910,672, filed Oct. 4, 2019, and entitled "FACILITATING A TIME-DIVISION MULTIPLEXING PATTERN-BASED SOLUTION FOR A DUAL-SUBSCRIBER IDENTITY MODULE WITH SINGLE RADIO IN ADVANCED NETWORKS," the entirety of which is expressly incorporated herein by reference.

TECHNICAL FIELD

This disclosure relates generally to the field of mobile communications and, more specifically, to wireless communications systems where multiple subscriber identity modules share a single radio.

BACKGROUND

To meet the huge demand for data centric applications, Third Generation Partnership Project (3GPP) systems and systems that employ one or more aspects of the specifications of the Fourth Generation (4G) standard for wireless communications will be extended to a 5G and/or Sixth Generation (6G) for wireless communications. Multiple-subscriber identity modules with a single radio has become popular. However, when a user device is on a long session (e.g., an extended period of time) of connection with one network, the user device can miss an incoming communication from another network since the user device has stopped listening to paging messages from the other network. This can result in an undesirable user experience since important communications can be missed. Accordingly, unique challenges exist to provide levels of service associated with subscriber identity modules with single radio for forthcoming 5G, 6G, and/or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
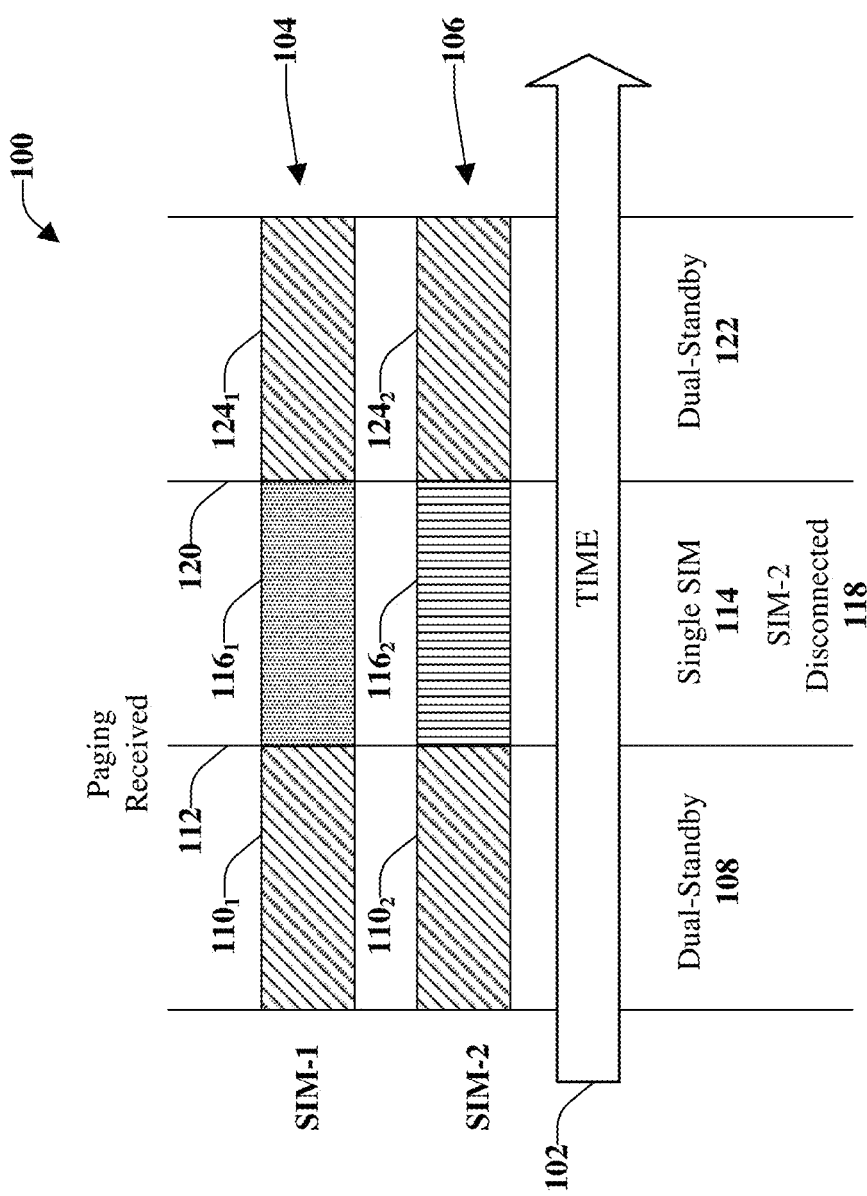
FIG. 1 illustrates an example, non-limiting, representation of a dual-subscriber identity module dual stand-by timeline for a user equipment device.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate a time-division multiplexing pattern-based solution for a dual-subscriber identity module with single radio in advanced networks. Specifically, the disclosed aspects relate to advanced wireless communications systems where multiple Subscriber Identity (or Identification) Modules (SIMs) share a single radio. A SIM (or SIM card) is an integrated circuit that can securely store an International Mobile Subscriber Identity (IMSI) number and associated key. The IMSI number and key are used to identify and authenticate subscribers of respective user equipment devices. Other information can also be stored on the SIM.

In one embodiment, described herein is a system that can comprise a processor and a memory that stores executable instructions that, when executed by the processor, facilitate performance of operations. The operations can comprise configuring multiple time-division multiplexing patterns for a user equipment device, resulting in multiple configured time-division multiplexing patterns. The multiple configured time-division multiplexing patterns can indicate respective repeating patterns of an on state and an off state of a defined identity of the user equipment device. The operations also can comprise selecting a time-division multiplexing pattern from the multiple configured time-division multiplexing patterns, resulting in a selected time-division multiplexing pattern. Further, the operations can comprise sending information indicative of the selected time-division multiplexing pattern to the user equipment device. The user equipment device can be configured to operate with dual-subscriber identity module. In an example, the respective repeating patterns comprise patterns that can alternate between the on state and the off state.

According to an implementation, selecting the time-division multiplexing pattern can comprise deactivating time-division multiplexing patterns of the multiple configured time-division multiplexing patterns, excluding the selected time-division multiplexing pattern.

In some implementations, sending the information indicative of the selected time-division multiplexing pattern can comprise establishing a defined scheduling for the user equipment device. Further to these implementations, establishing the defined scheduling can comprise scheduling downlink control information that comprises a field dedicated for sending the information indicative of the selected time-division multiplexing pattern. Alternatively, or additionally, establishing the defined scheduling can comprise configuring downlink control information with a defined fixed payload for selection of the time-division multiplexing pattern. Further to the these implementations, sending information indicative of the selected time-division multiplexing pattern can comprise transmitting a reference signal comprising a defined sequence.

According to some implementations, configuring the time-division multiplexing pattern can comprise receiving, from the user equipment device, a request to enter a time-division multiplexing mode and a recommended time-division multiplexing pattern. In an example, the time-division multiplexing pattern can be a periodic resource in a time domain.

According to another embodiment, provided is a method that can comprise obtaining, by a network device comprising a processor, multiple time-division multiplexing patterns applicable to a mobile device. The multiple time-division multiplexing patterns can indicate respective repeating patterns of an on state and an off state of a defined identity of the mobile device. The method also can comprise facilitating, by the network device, a transmission, to the mobile device, of information indicative of the multiple time-division multiplexing patterns. In an example, the mobile device can be configured to operate with at least two subscriber identity modules.

Prior to facilitating the transmission, the method can comprise, according to some implementations, selecting, by the network device, the multiple time-division multiplexing patterns from a group of time-division multiplexing patterns.

In some implementations, prior to obtaining the multiple time-division multiplexing patterns, the method can comprise receiving from the mobile device a request for configuration of a time-division multiplexing pattern for partial access for communication with the network device.

Obtaining the multiple time-division multiplexing patterns can comprise, in some implementations, activating at least one time-division multiplexing pattern of the multiple time-division multiplexing patterns. Further, obtaining the multiple time-division multiplexing patterns can comprise deactivating other time-division multiplexing patterns of the multiple time-division multiplexing patterns, excluding the at least one time-division multiplexing pattern.

According to some implementations, facilitating the transmission can comprise establishing a defined scheduling for the mobile device. Further, data for the mobile device is not scheduled during the off state.

In an example, facilitating the transmission of information indicative of the multiple time-division multiplexing patterns can comprise transmitting a reference signal comprising a defined sequence. In another example, the multiple time-division multiplexing patterns can be periodic resources in a time domain.

Yet another embodiment relates to a non-transitory machine-readable storage medium, comprising executable instructions that, when executed by a processor, facilitate performance of operations. The operations can comprise receiving, from a network device, information indicative of selected time-division multiplexing patterns based on a request to enter a time-division multiplexing mode. The selected time-division multiplexing patterns indicate respective repeating patterns of an on state and an off state of a user equipment device. The operations also can comprise monitoring a first group of control channels based on a determination that a first group of time-division multiplexing patterns of the selected time-division multiplexing patterns are in the on state.

In an example, the operations can comprise determining that a second group of control channels for a second group of time-division multiplexing patterns of the selected time-division multiplexing patterns are not monitored based on the second group of time-division multiplexing patterns being in the off state.

According to some implementations, prior to receiving information indicative of the selected time-division multiplexing patterns, the operations can comprise sending, to the network device, a message requesting configuration of a time-division multiplexing pattern for partial access for communication with the network device.

The operations also can comprise, according to some implementations, sending a first recommended time-division multiplexing pattern to the first network device and a second recommended time-division multiplexing pattern to a second network device. The first recommended time-division multiplexing pattern and the second recommended time-division multiplexing pattern can be non-overlapping in a time domain.

In further detail, recently, multiple SIMs (multi-SIM) with a single radio has become a popular setup in various scenarios. Example scenarios include user equipment devices (e.g., smart phones), vehicles (e.g., smart vehicles), Mobile Data Terminal (MDT) communication areas, as well as others. MDT, sometimes referred to as a Mobile Digital Computer (MDC), is a computerize device that can be used in public transport vehicles (e.g., livery vehicles such as taxi cabs or courier vehicles), commercial vehicles (e.g., trucking fleets, delivery vehicles, service vehicles), and emergency vehicles (e.g. police vehicles, fire engines, ambulances, and so on) to communicate with a central dispatch communication center. Further the computerized device for MDT (or MDC) communications can be used in various other vehicles such as, but not limited to, military logistics, fishing fleets, and so on. Additionally, the computerized device for MDT (or MDC) communications can be used for warehouse inventory control, to display electronic mapping information and/or information associated with the tasks and actions performed by the vehicle.

A use scenario for a multi-SIM deployment is a first SIM for private communications and a second SIM for work communications. Another use case is to have a local SIM card, which can be deployed to avoid roaming fees.

When a User Equipment (UE) device is connecting to two networks, it can be difficult to establish tight synchronization between the networks. This is regardless of whether the two networks are operated by a single operator or by different operators. With such challenges, all traditional single radio multi-SIM solutions focus on support of dual-SIM without awareness by the network. The traditional solutions are categorized as dual-SIM dual stand-by solutions since the UE device is in stand-by mode for both SIMs. For a UE device in idle mode, the UE device will monitor the paging channel for both SIMs/networks. When paged by one network, the UE device starts the access, as in a single-SIM solution. Thus, the UE device is in active mode with that SIM/network. When the UE device is in active mode with one network, the UE device stops (or suspends) monitoring paging messages from another network. To explain this situation, FIG. 1 illustrates an example, non-limiting, representation of a dual-SIM dual stand-by timeline 100 for a UE device.

In FIG. 1, there are two SIMs associated with the UE device, illustrated as a first SIM (SIM-1) and a second SIM (SIM-2). Time 102 is represented horizontally, wherein SIM-1 has a first timeline 104, and SIM-2 has a second timeline 106. The SIMs (e.g., SIM-1 and SIM-2) are on dual-standby mode 108, as indicated by the first period of times $110_1$ and $110_2$, respectively. The SIMs remain in the dual-standby mode 108 until a paging is received, as indicated at time 112. Upon or after the paging is received (at time 112), the UE device enters into a single-SIM situation 114. Thus, SIM-1 switches from the dual-standby mode (e.g., indicated by the first period of time $110_1$) to an active mode, indicated by a second period of time $116_1$. Further, SIM-2 switches from the dual-standby mode (e.g., indicated by the first period of time $110_2$) to a disconnected mode 118, indicated by a second period of time $116_2$. Upon or after SIM-1 stops monitoring paging messages from the network as indicated at time 120, SIM-1 and SIM-2 enter into another dual-standby mode 122, as indicated by the third period of times $124_1$ and $124_2$, respectively.

The dual-SIM dual stand-by solution, as illustrated in the example of FIG. 1, can be simple and effective since it does not require cooperation from the network and can support a large number of use cases since the UE device is in standby mode a majority of the time. However, a problem associated with the dual-SIM dual stand-by solution is that when a UE device is on a long session of connection with a first network (e.g. voice call, periodical data transmission, and so on), the UE device will miss the incoming data or voice call from another network since the UE device has skipped (e.g., discontinued, at least temporarily) listening to the paging message from the other network. This can result in an undesirable user experience as the UE device can miss one or more communications.

Accordingly, as discussed herein, provided is a Time-Division Multiplexing (TDM) pattern that is based on multi-SIM with single radio protocol that allows the UE device to keep connecting to both SIMs. It is noted that a dual-SIM UE equipment device is used as an example herein. However, it is noted that the same (or a similar) idea can be easily expanded to more than a two SIM card scenario.

Figure 2:
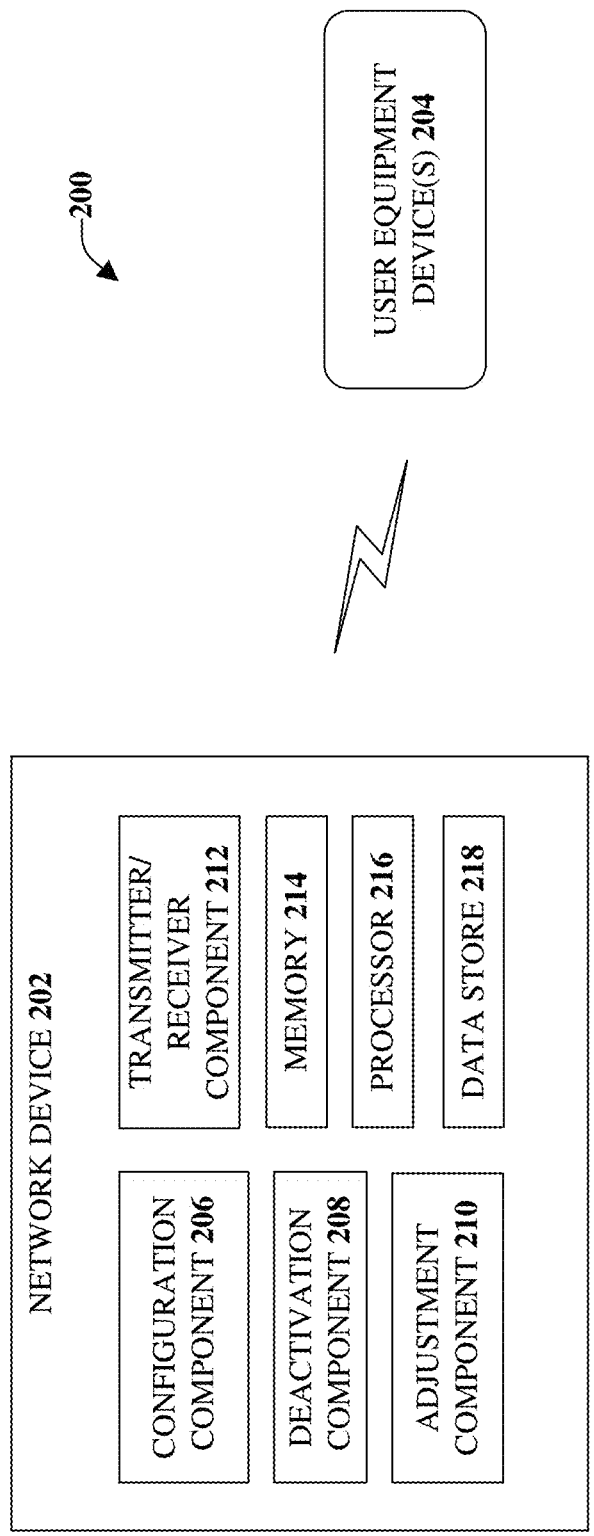
FIG. 2 illustrates an example, non-limiting, system that can facilitate a time-division multiplexing pattern-based solution for a dual-subscriber identity module with single radio in advanced networks in accordance with one or more embodiments described herein.

FIG. 2 illustrates an example, non-limiting, system 200 that can facilitate a TDM pattern-based solution for dual-subscriber identity module with single radio in advanced networks in accordance with one or more embodiments described herein.

Aspects of systems (e.g., the system 200 and the like), apparatuses, or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system 200 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 200 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated in FIG. 2, the system 200 can include a network device 202 and a UE device 204. The network device 202 can be included in a group of network devices of a wireless network. Further, the UE device 204 can be configured with dual SIM capability (or more than a dual SIM capability). Although only one equipment device and a single network device are shown and described, the various aspects are not limited to this implementation. Instead, multiple UE devices and/or multiple network devices can be included in a communications system.

The network device 202 can include a configuration component 206, a deactivation component 208, an adjustment component 210, a transmitter/receiver component 212, at least one memory 214, at least one processor 216, and at least one data store 218.

The configuration component 206 can configure a TDM pattern for the UE device 204. The TDM pattern can be utilized by the UE device in order to operate in the dual-SIM mode. The TDM pattern can be defined as a periodic resource in the time domain. TDM patterns can include at least two states, namely, an "on" state and an "off" state. During the "on" state, the UE device 204 can continue to monitor one or more Physical Downlink Control Channels (PDCCHs) for scheduling. Alternatively, during the "off" state, the UE device 204 can stop monitoring the PDCCH. Accordingly, the network device 202 (e.g., the configuration component 206) can configure the UE device 204 into a micro sleep pattern. Upon or after the network device 202 grants a TDM pattern to the UE device 204 (e.g., via the transmitter/receiver component 212), the network device 202 should not (e.g., must ensure to not) schedule data (including paging message) to the UE device 204 during the "off" status.

In another example the "on" states of the TDM pattern can comprise "soft" resources or resources in which a configurable subset of resources within the duration of the TDM pattern corresponding to the "on" state which can be dynamically selected by the network device 202 for scheduling of the UE device 204. If the network device 202 determines to not use the soft resources of the TDM pattern for scheduling, the network device 202 can inform another network device (e.g., a second network device) that the soft resources are "released" or "indicated as available." In this case, the second network device can schedule the UE device 204, overriding the "off" state of the TDM pattern in the corresponding resources. The granularity of the soft resources can be smaller than or equal to the resource granularity of the TDM pattern and can be updated more frequently than the configuration of the TDM pattern (e.g. based on traffic buffer status), according to some implementations. At a later time, the network device 202 can update the status of the soft resources as "indicated not available," making those resources unavailable for another network device (e.g., the second network device) to utilize for scheduling the UE device 204, in alignment with the configured TDM pattern.

The dual-SIM UE device (e.g., the UE device 204) can request the network (e.g., the network device 202 via the transmitter/receiver component 212) to configure a TDM pattern to access the network partially with a recommended TDM pattern. The UE device 204 should recommend different TDM patterns (non-overlapping in time domain) to different networks (e.g., the network device 202 and another network device (not illustrated). If both networks grant their respective TDM patterns, the UE device 204 can TDM switch its radio to receive and transmit data from/to each network.

When two networks are not aligned in a Single Frequency Network (SFN) or in slot, a dual-SIM UE device should consider the timing offset between the two networks when forming up the two orthogonal TDM patterns. This can help ensure that, at any given time, the UE device will not be in "on" state for both networks.

According to some implementations, the deactivation component 208 can dynamically turn off the TDM pattern. Additionally, or alternatively, in some implementations, the adjustment component 210 can switch the UE device 204 to a different TDM pattern. Additionally, or alternatively, the adjustment component 210 can adapt a subset of resources of the TDM pattern configured as soft resources to be either "indicated available" or "indicated as not available."

For example, deactivating (e.g., turning off) the TDM pattern and/or switching to a different TDM pattern can be based on changes in the network. For example, in some implementations, the UE device 204 can calculate a timing offset between the network and adjust a recommended TDM pattern and/or an updated recommended TDM pattern based on changes within the network. The updated recommended TDM pattern can include disabling a current TDM pattern. In some cases, the updated recommended TDM pattern can include switching to another TDM pattern, different from the current TDM pattern.

According to some implementations, based on heavy traffic or latency sensitive traffic, which can be detected based on changing conditions in the network (which can be continually monitored), the UE device 204 can be switching to an always "on" mode or to a TDM pattern (e.g., a different TDM pattern) with a high ratio of "on" time, for example.

Figure 3:
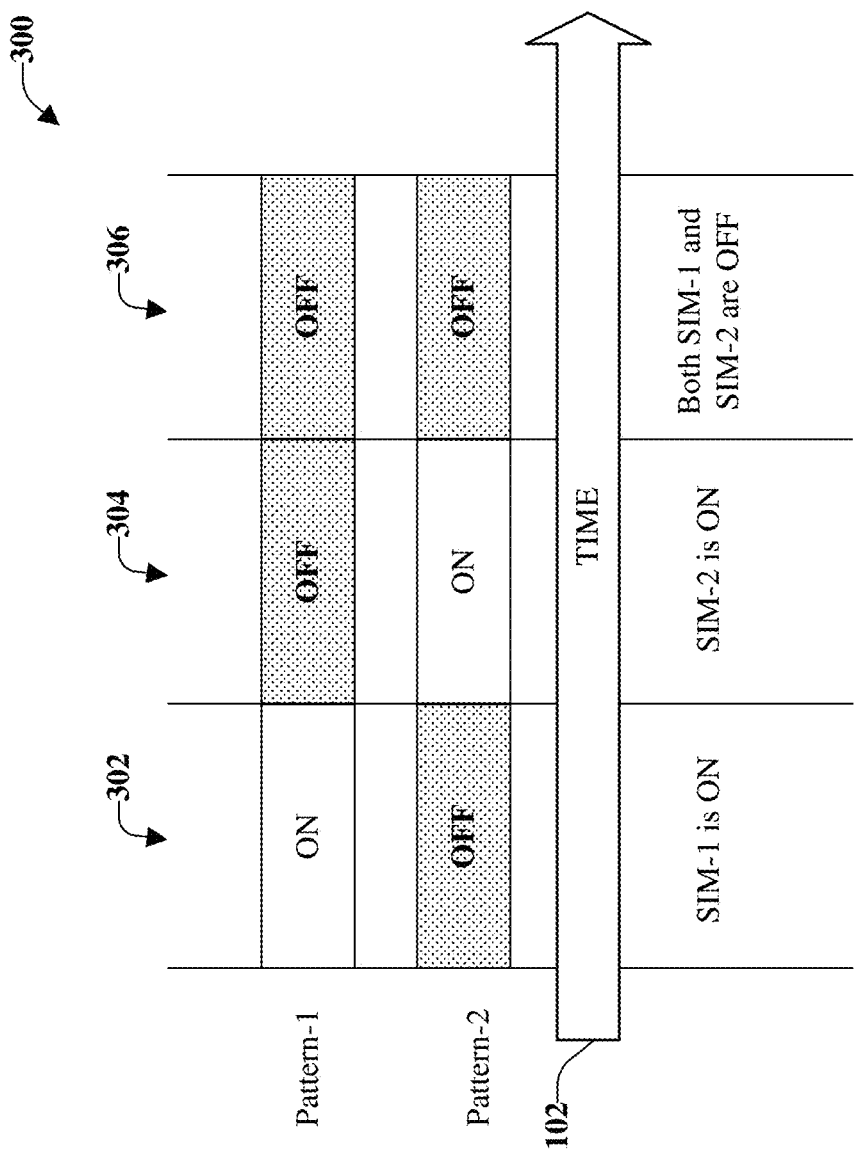
FIG. 3 illustrates an example, non-limiting, representation of a dual-SIM dual stand-by timeline for a user equipment device in accordance with one or more embodiments described herein.

FIG. 3 illustrates an example, non-limiting, representation of a dual-SIM dual stand-by timeline 300 for a UE device in accordance with one or more embodiments described herein. Repetitive description of like elements employed in other embodiments described herein is omitted for sake of brevity.

Time 102 is represented horizontally. Illustrated are a first pattern, Pattern-1, and a second pattern, Pattern-2. When SIM-1 is "on", represented by column 302, Pattern-1 is 'on" and Pattern-2 is "off." Further, when SIM-2 is "on", represented by column 304, Pattern-1 is "off" and Pattern 2 is "on." In addition, when both SIM-1 and SIM-2 are "off", both Pattern-1 and Pattern-2 are off, as indicated by column 306.

With reference again to FIG. 2, the transmitter/receiver component 212 can be configured to transmit to, and/or receive data from, the UE device 204, other network devices, and/or other UE devices. Through the transmitter/receiver component 212, the network device 202 can concurrently transmit and receive data, can transmit and receive data at different times, or combinations thereof. According to some implementations, the transmitter/receiver component 212 can facilitate communications between the network device 202 and the UE device 204.

The at least one memory 214 can be operatively connected to the at least one processor 216. The at least one memory 214 can store executable instructions that, when executed by the at least one processor 216 can facilitate performance of operations. Further, the at least one processor 216 can be utilized to execute computer executable components stored in the at least one memory 214.

For example, the at least one memory 214 can store protocols associated with facilitating a TDM pattern-based solution for a dual-subscriber identity module with single radio in advanced networks as discussed herein. Further, the at least one memory 214 can facilitate action to control communication between the network device 202, the UE device 204, other network devices, and/or other UE devices such that the network device 202 can employ stored protocols and/or algorithms to achieve improved communications in a wireless network as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as Synchronous RAM (SRAM), Dynamic RAM (DRAM), Synchronous DRAM (SDRAM), double data rate SDRAM (DDR SDRAM), Enhanced SDRAM (ESDRAM), Synchlink DRAM (SLDRAM), and Direct Rambus RAM (DRRAM). Memory of the disclosed aspects are intended to comprise, without being limited to, these and other suitable types of memory.

The at least one processor 216 can facilitate respective analysis of information related to facilitating a TDM pattern-based solution for a dual-subscriber identity module with single radio in advanced networks. The at least one processor 216 can be a processor dedicated to analyzing and/or generating information received, a processor that controls one or more components of the network device 202, and/or a processor that both analyzes and generates information received and controls one or more components of the network device 202.

Further, the term network device (e.g., network node, network node device) is used herein to refer to any type of network node serving communication devices and/or connected to other network nodes, network elements, or another network node from which the communication devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network device 202) can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, a Remote Radio Unit (RRU), a Remote Radio Head (RRH), nodes in distributed antenna system (DAS), and the like.

Figure 4:
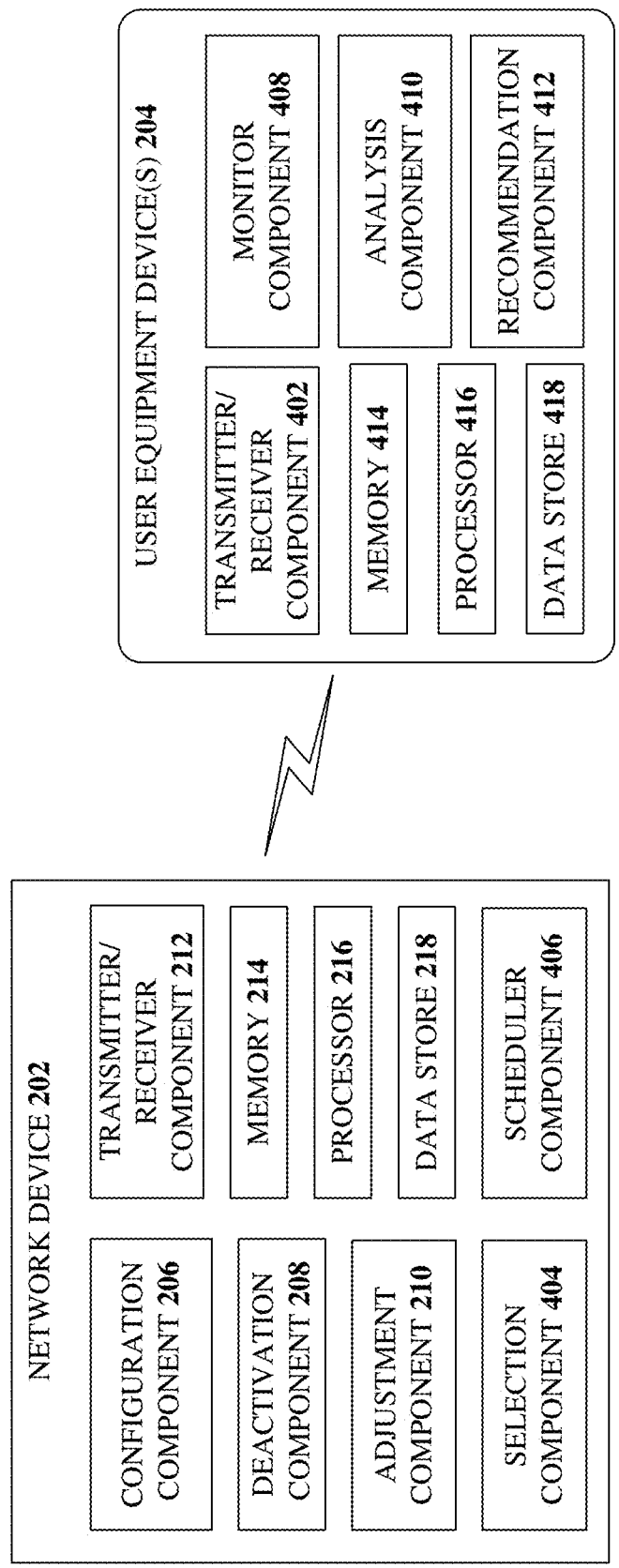
FIG. 4 illustrates an example, non-limiting, system that supports a dual subscriber identity module single radio user equipment device in accordance with one or more embodiments described herein.

FIG. 4 illustrates an example, non-limiting, system 400 that supports a dual subscriber identity module single radio UE device in accordance with one or more embodiments described herein. Repetitive description of like elements employed in other embodiments described herein is omitted for sake of brevity. The system 400 can comprise one or more of the components and/or functionality of the system 200 and vice versa.

The configuration component 206 can configure multiple TDM patterns for the UE device, which can result in multiple configured TDM patterns. The multiple TDM patterns can indicate respective repeating patterns of an on state and an off state of a defined identity of a UE device (e.g., the UE device 204). In an example, the configuration component 206 can configure the multiple TDM patterns based on a request received from the UE device 204. For example, the UE device 204 can comprise a transmitter/receiver component 402 that can facilitate communication between the UE device 204 and the network device 202, as well as other devices (e.g., other UE devices, other network devices, and so on).

According to some implementations, to configure the multiple TDM patterns, the configuration component 206 can receive, with the request from the UE device 204, a recommended TDM pattern. Thus, the UE device 204 can recommend one or more TDM patterns.

A selection component 404 can choose a TDM pattern from the multiple configured TDM patterns (e.g., the TDM patterns). The choice of the TDM pattern can result in a selected TDM pattern. According to some implementations, selection of the TDM pattern by the selection component 404 can include deactivation, by the deactivation component 208, of the multiple TDM patterns except for the selected TDM pattern.

A scheduler component 406 can establish a defined scheduling for the UE device 204. For example, to establish the defined scheduling, the scheduler component 406 can schedule downlink control information with a field dedicated for sending the information indicative of the selected TDM pattern to the UE device 204 (e.g., via the transmitter/receiver component 212. For example, a field can be defined exclusively for the information indicative of the selected TDM pattern. In some implementations, the field is not defined exclusively for the information indicative of the selected TDM pattern but can be used for other information, if not needed for indicating the TDM pattern(s). In other implementations, a spare field or a field not being utilized for other information can be used for the information indicative of the selected TDM pattern.

According to some implementations, to establish the defined scheduling, the scheduler component 406 can configure the downlink control information with a defined fixed payload to select the TDM pattern. The payload can be fixed in order to not consume too much of the payload to select the TDM pattern. However, in some implementations, the payload is not fixed but can be within a defined range (as determined by design considerations). In other implementations, there are no restrictions placed on the size of the payload to utilize.

In some implementations, to send the information indicative of the selected TDM pattern, the transmitter/receiver component 402 can transmit a reference signal (RS) with a defined sequence. The reference signal can be a new reference signal specifically utilized to the send the information as discussed herein.

The transmitter/receiver component 402 can be configured to transmit to, and/or receive data from, the network device 202, other UE devices, and/or other network devices. Through the transmitter/receiver component 402, the UE device 204 can concurrently transmit and receive data, can transmit and receive data at different times, or combinations thereof. According to some implementations, the transmitter/receiver component 402 can facilitate communications between the UE device 204 and the network device 202.

According to some implementations, the transmitter/receiver component 402 can receive, from the network device, the information indicative of the selected TDM patterns based on a request (sent by the UE device 204 via the transmitter/receiver component 402) to enter a TDM mode. As mentioned, the selected TDM patterns can indicate respective repeating patterns of an on state and an off state of a defined identity of the UE device 204. For example, a message can be sent (via the transmitter/receiver component 402) to the network device 202 requesting configuration of a TDM pattern for partial access for communication with the network device 202.

A monitor component 408 can monitor a first group of control channels based on a determination that a first group of TDM patterns of the selected TDM patterns are in the on state, which can be determined by an analysis component 410. Further, the analysis component 410 can determine that a second group of control channels for a second group of TDM patterns of the selected TDM patterns are not monitored based on the second group of TDM patterns being in the off state.

Further, a recommendation component 412 can determine one or more TDM patterns that should be utilized at the UE device 204 based on various device and/or network conditions. In some implementations, different TDM patterns recommendation can be sent (via the transmitter/receiver component 402) to different network devices. For example, the transmitter/receiver component 402 can send a first recommended TDM pattern to the network device 202 (e.g., a first network device) and at least a second recommended TDM pattern to another network device (e.g., a second network device, a third network device, a subsequent network device, and so on). The first recommended TDM pattern and at least the second recommended TDM pattern can be non-overlapping in a time domain.

As illustrated, the UE device 204 also can comprise at least one memory 414, at least one processor 416, and at least one data store 418. The at least one memory 414 can be operatively connected to the at least one processor 416. The at least one memory 414 can store executable instructions that, when executed by the at least one processor 416 can facilitate performance of operations. Further, the at least one processor 416 can be utilized to execute computer executable components stored in the at least one memory 414.

For example, the at least one memory 414 can store protocols associated with facilitating a TDM pattern-based solution for a dual-subscriber identity module with single radio in advanced networks as discussed herein. Further, the at least one memory 414 can facilitate action to control communication between the UE device 204, the network device 202, other UE devices, and/or other network devices such that the network device 202 can employ stored protocols and/or algorithms to achieve improved communications in a wireless network as described herein.

The at least one processor 416 can facilitate respective analysis of information related to facilitating a TDM pattern-based solution for a dual-subscriber identity module with single radio in advanced networks. The at least one processor 416 can be a processor dedicated to analyzing and/or generating information received, a processor that controls one or more components of the UE device 204, and/or a processor that both analyzes and generates information received and controls one or more components of the UE device 204.

Figure 5:
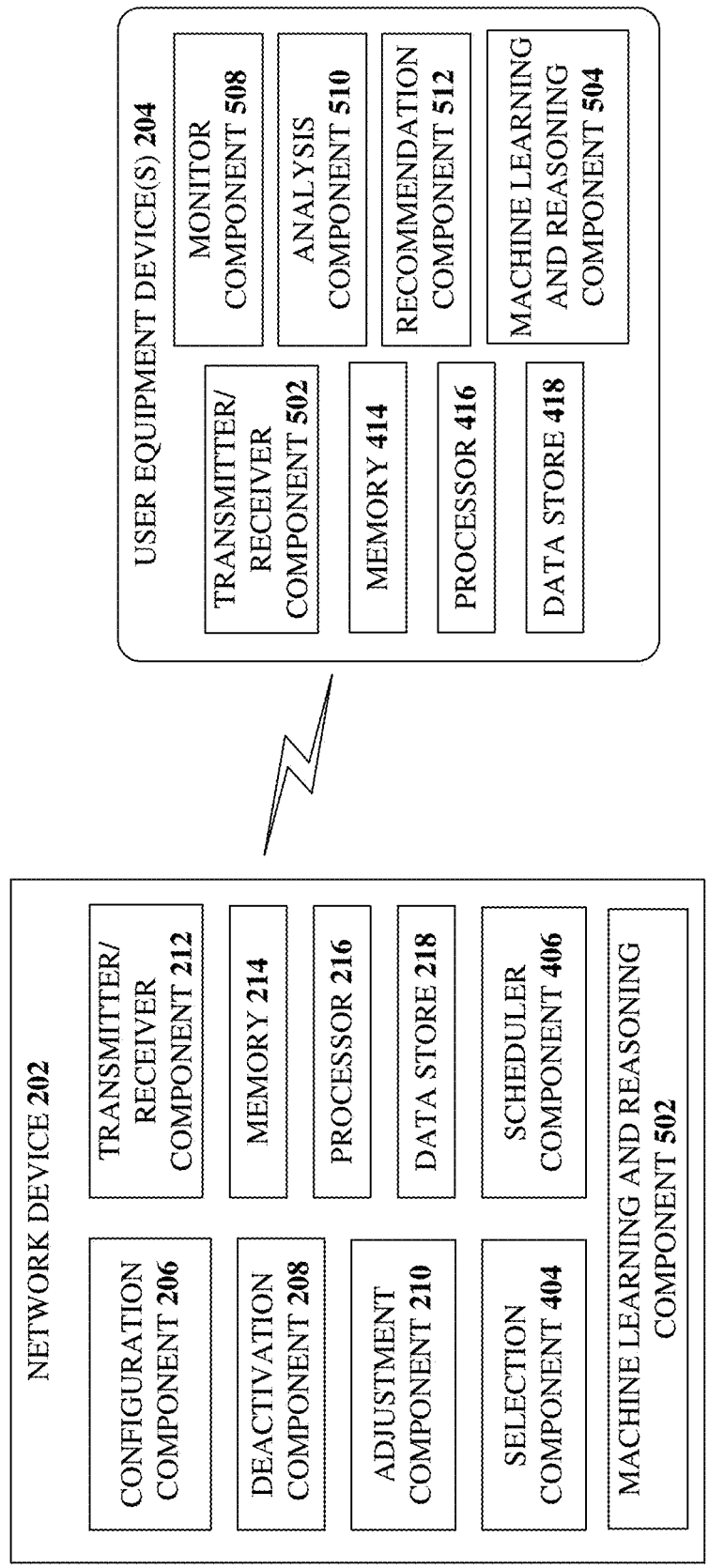
FIG. 5 illustrates an example, non-limiting, system that employs automated learning to facilitate one or more of the disclosed aspects in accordance with one or more embodiments described herein.

FIG. 5 illustrates an example, non-limiting, system 500 that employs automated learning to facilitate one or more of the disclosed aspects in accordance with one or more embodiments described herein. Repetitive description of like elements employed in other embodiments described herein is omitted for sake of brevity. The system 500 can comprise one or more of the components and/or functionality of the system 200, the system 400, and vice versa.

As illustrated, the network device 202 can comprise a machine learning and reasoning component 502 that can be utilized to automate one or more of the disclosed aspects. Alternatively, or additionally, the UE device 204 can comprise a machine learning and reasoning component 504 that can be utilized to automate one or more of the disclosed aspects. The machine learning and reasoning component 502 (and/or the machine learning and reasoning component 504) can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 502 (and/or the machine learning and reasoning component 504) can employ principles of probabilistic and decision theoretic inference. Additionally, or alternatively, the machine learning and reasoning component 502 (and/or the machine learning and reasoning component 504) can rely on predictive models constructed using machine learning and/or automated learning procedures. Logic-centric inference can also be employed separately or in conjunction with probabilistic methods.

The machine learning and reasoning component 502 (and/or the machine learning and reasoning component 504) can infer which TDM pattern(s) to configure for the UE device 204, whether one or more TDM patterns should be turned on (e.g., activated) or turned off (e.g., deactivated), whether the UE device 204 should be switched to another TDM pattern, and so on, by obtaining knowledge about the possible TDM patterns and information about the UE device 204. Based on this knowledge, the machine learning and reasoning component 502 (and/or the machine learning and reasoning component 504) can make an inference based on which TDM pattern(s) to configure for the UE device 204, whether one or more TDM patterns should be turned on (e.g., activated) or turned off (e.g., deactivated), whether the UE device 204 should be switched to another TDM pattern, and so on, or combinations thereof.

As used herein, the term "inference" refers generally to the process of reasoning about or inferring states of a system, a component, a module, an environment, and/or devices from a set of observations as captured through events, reports, data and/or through other forms of communication. Inference can be employed to identify a specific TDM pattern and/or action related to the TDM pattern, or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with configuring a UE device with a TDM pattern or multiple TDM patterns, at least temporarily activating or at least temporarily deactivating one or more TDM patterns, changing one or more TDM patterns to a different pattern, and so forth) can employ various artificial intelligence-based schemes for carrying out various aspects thereof. For example, a process for determining if a particular TDM pattern should be assigned, activated, deactivated, or changed can be enabled through an automatic classifier system and process.

A classifier is a function that maps an input attribute vector, $x=(x1, x2, x3, x4, xn)$, to a confidence that the input belongs to a class. In other words, $f(x)=confidence(class)$. Such classification can employ a probabilistic and/or statistical-based analysis (e.g., factoring into the analysis utilities and costs) to provide a prognosis and/or infer one or more actions that should be employed to determine what actions related to a TDM pattern should be automatically performed.

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained. For example, SVMs can be configured through a learning or training phase within a classifier constructor and feature selection module. Thus, a classifier(s) can be used to automatically learn and perform a number of functions, including but not limited to configuring a UE device with a TDM pattern or multiple TDM patterns, activating or deactivating (at least temporarily) one or more TDM patterns, changing one or more TDM patterns to a different pattern, and so forth.

Additionally, or alternatively, an implementation scheme (e.g., a rule, a policy, and so on) can be applied to control and/or modify TDM patterns as discussed herein. In some implementations, based upon a predefined criterion, the rules-based implementation can automatically and/or dynamically configure and/or modify TDM patterns for a UE device. In response thereto, the rule-based implementation can automatically interpret and carry out functions associated with the TDM pattern by employing a predefined and/or programmed rule(s) based upon any desired criteria.

Methods that can be implemented in accordance with the disclosed subject matter, will be better appreciated with reference to various flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 6:
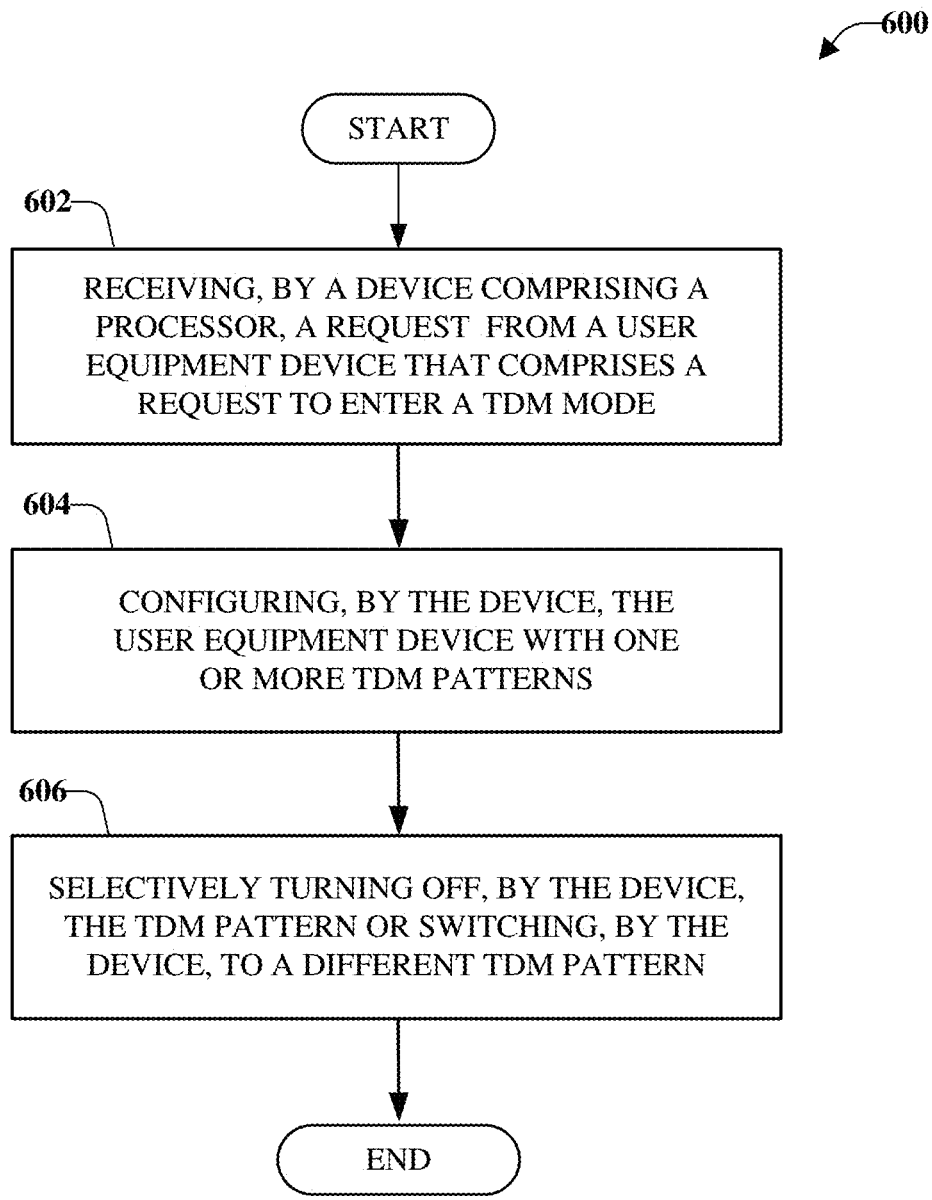
FIG. 6 illustrates a flow diagram of an example, non-limiting, computer-implemented method for facilitating an enhanced time-division multiplexing pattern for a dual-subscriber identity module with a single radio in advanced networks in accordance with one or more embodiments described herein.

FIG. 6 illustrates a flow diagram of an example, non-limiting, computer-implemented method 600 for facilitating an enhanced TDM pattern for dual-SIM with a single radio in advanced networks in accordance with one or more embodiments described herein. Repetitive description of like elements employed in other embodiments described herein is omitted for sake of brevity.

In some implementations, a system comprising a processor can perform the computer-implemented method 600 and/or other methods discussed herein. In other implementations, a device comprising a processor can perform the computer-implemented method 600 and/or other methods discussed herein. In other implementations, a machine-readable storage medium, can comprise executable instructions that, when executed by a processor, facilitate performance of operations, which can be the operations discussed with respect to the computer-implemented method 600 and/or other methods discussed herein. In further implementations, a computer readable storage device comprising executable instructions that, in response to execution, cause a system comprising a processor to perform operations, which can be operations discussed with respect to the computer-implemented method 600 and/or other methods discussed herein.

At 602 of the computer-implemented method 600, a system comprising a processor can receive a request from a UE device that comprises a request to enter a TDM mode (e.g., via the transmitter/receiver component 212). According to some implementations, the request can include a recommendation of a TDM pattern.

Based, at least in part, on the request, at 604 of the computer-implemented method 600, the system can configure one or multiple TDM patterns to the UE device (e.g., via the configuration component 206). For example, the system can configure multiple TDM patterns for a UE device, resulting in multiple configured TDM patterns. The TDM patterns can indicate respective repeating patterns of an "on" state and an "off" state. Further, configuring the multiple TDM patterns can be based on the request from the UE device.

According to some implementations, TDM patterns of the TDM patterns can indicate a repeating pattern of "on" and "off" states. According to some implementations, the UE device is not required to monitor PDCCH during the slots marked as "off" in the TDM pattern.

In addition, the system can select a TDM pattern from the multiple configured TDM patterns, resulting in a selected TDM pattern. Information indicative of the selected TDM pattern can be sent to the UE device.

According to some implementations, sending the information indicative of the selected TDM pattern can comprise establishing a defined scheduling for the UE device. In an example, providing the defined scheduling can comprise scheduling downlink control information with a field dedicated for sending the information indicative of the selected TDM pattern.

Further, at 606 of the computer-implemented method 600, the system can selectively turn off (e.g., deactivate) the TDM pattern (e.g., via the deactivation component 208). For example, selecting the TDM pattern can comprise deactivating the multiple TDM patterns, excluding the selected TDM pattern.

Additionally, or alternatively, the system can switch to a different TDM pattern through utilization of the following signaling (e.g., via the adjustment component 210). Scheduling downlink control information with a new field (e.g., a field dedicated for the selectively deactivating). Providing the downlink control information with a defined fixed payload to select the TDM pattern. Providing a (new) reference signal (RS) with a defined (e.g., specific) sequence.

Figure 7:
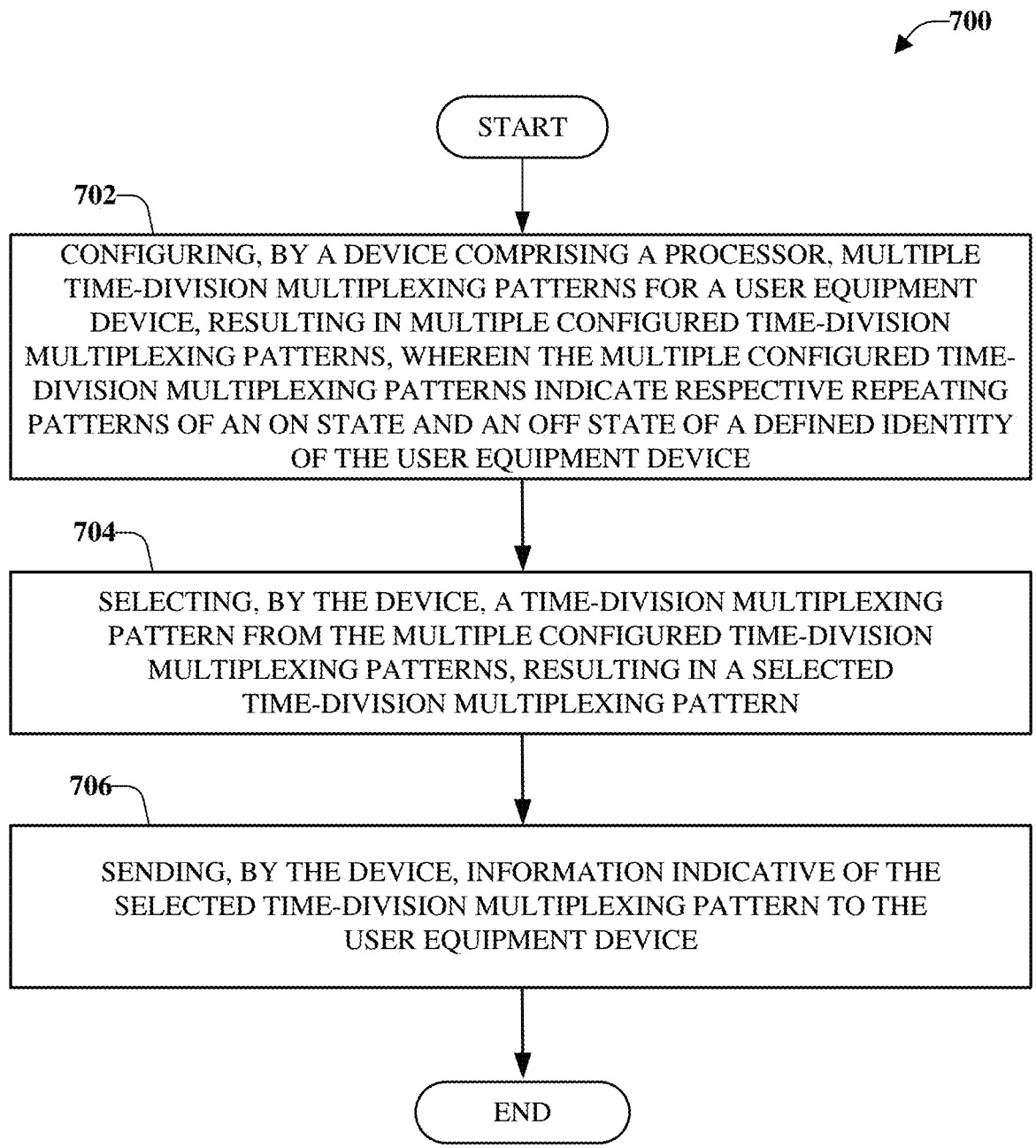
FIG. 7 illustrates a flow diagram of an example, non-limiting, computer-implemented method for configuring a user equipment device with one or more time-division multiplexing patterns in advanced networks in accordance with one or more embodiments described herein.

FIG. 7 illustrates a flow diagram of an example, non-limiting, computer-implemented method 700 for configuring a UE device with one or more TDM patterns in advanced networks in accordance with one or more embodiments described herein. Repetitive description of like elements employed in other embodiments described herein is omitted for sake of brevity.

In some implementations, a system comprising a processor can perform the computer-implemented method 700 and/or other methods discussed herein. In other implementations, a device comprising a processor can perform the computer-implemented method 700 and/or other methods discussed herein. In other implementations, a machine-readable storage medium, can comprise executable instructions that, when executed by a processor, facilitate performance of operations, which can be the operations discussed with respect to the computer-implemented method 700 and/or other methods discussed herein. In further implementations, a computer readable storage device comprising executable instructions that, in response to execution, cause a system comprising a processor to perform operations, which can be operations discussed with respect to the computer-implemented method 700 and/or other methods discussed herein.

At 702 of the computer-implemented method 700, a network device comprising a processor can configure multiple TDM patterns for a UE device (e.g., via the configuration component 206). The UE device can be configured to operate with dual-subscriber identity modules (or more than two subscriber identity modules). Further, the TDM pattern can be a periodic resource in a time domain.

The configuration of the multiple TDM patterns can result in multiple configured TDM patterns. Further, the multiple configured TDM patterns can indicate respective repeating patterns of an on state and an off state of a defined identity of the user equipment device. The respective repeating patterns can comprise patterns that can alternate between the on state and the off state.

According to some implementations, prior to configuring the multiple TDM patterns, a request, from the UE device, to enter a TDM mode can be received. In an optional implementation, the request (or another communication from the UE device) can comprise a recommended TDM pattern.

A TDM pattern can be selected, at 704 of the computer-implemented method 700, from the multiple configured TDM patterns (e.g., via the selection component 404). Selection of the TDM pattern can result in a selected TDM pattern. According to some implementations, selecting the TDM pattern can comprise deactivating at least some of the TDM patterns. For example, TDM patterns of the multiple configured TDM patterns, excluding the selected TDM pattern, can be selectively deactivated.

Further, at 706 of the computer-implemented method 700, the network device can send information indicative of the selected TDM pattern to the UE device (e.g., via the transmitter/receiver component 212). Based on sending the information indicative of the selected TDM pattern, a defined scheduling for the UE device can be established. For example, to establish the defined scheduling, downlink control information that comprises a field dedicated for the sending the information indicative of the selected TDM pattern can be scheduled. According to some implementations, to establish the defined scheduling, downlink control information can be configured with a defined fixed payload for selection of the TDM pattern. In some implementations, a reference signal that comprises a defined sequence can be transmitted to the UE device.

Figure 8:
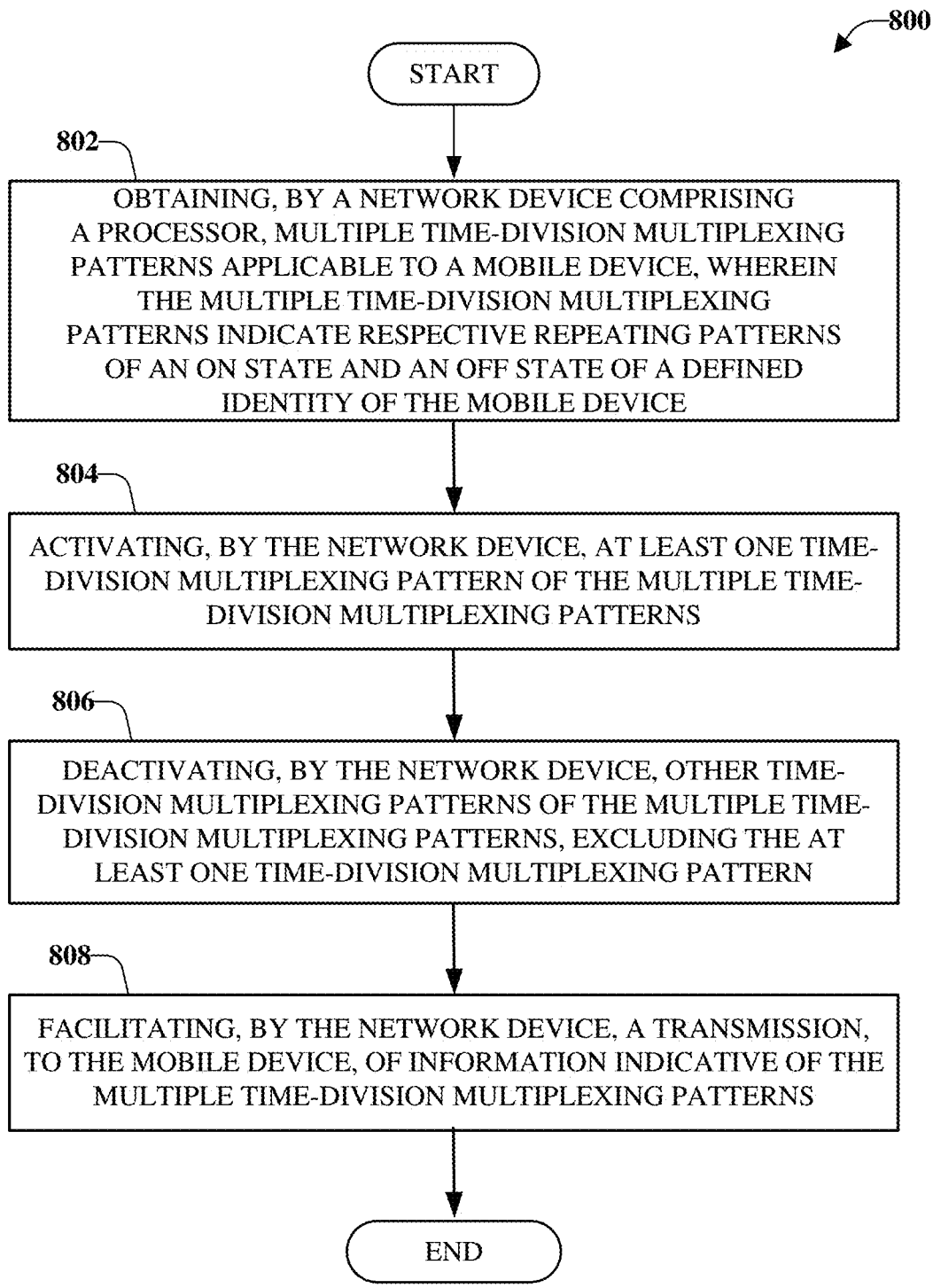
FIG. 8 illustrates a flow diagram of an example, non-limiting, computer-implemented method for configuring a user equipment device with one or more time-division multiplexing patterns in advanced networks in accordance with one or more embodiments described herein.

FIG. 8 illustrates a flow diagram of an example, non-limiting, computer-implemented method 800 for configuring a UE device with one or more TDM patterns in advanced networks in accordance with one or more embodiments described herein. Repetitive description of like elements employed in other embodiments described herein is omitted for sake of brevity.

In some implementations, a system comprising a processor can perform the computer-implemented method 800 and/or other methods discussed herein. In other implementations, a device comprising a processor can perform the computer-implemented method 800 and/or other methods discussed herein. In other implementations, a machine-readable storage medium, can comprise executable instructions that, when executed by a processor, facilitate performance of operations, which can be the operations discussed with respect to the computer-implemented method 800 and/or other methods discussed herein. In further implementations, a computer readable storage device comprising executable instructions that, in response to execution, cause a system comprising a processor to perform operations, which can be operations discussed with respect to the computer-implemented method 800 and/or other methods discussed herein.

At 802 of the computer-implemented method 800, a network device comprising a processor can obtain multiple TDM patterns applicable to a mobile device (e.g., via the transmitter/receiver component 212, via the configuration component 206). The multiple TDM patterns can indicate respective repeating patterns of an on state and an off state of a defined identity of the mobile device. The mobile device can be configured to operate with at least two subscriber identity modules.

According to some implementations, to obtain the multiple TDM patterns, at 804 the network device can activate at least one TDM pattern of the multiple TDM patterns (e.g., via the configuration component 206, via the selection component 404). Further, at 806, the network device can deactivate other TDM patterns of the multiple TDM patterns, excluding the at least one TDM pattern. In some implementations, prior to obtaining the multiple TDM patterns, the network device can receive from the mobile device, a request for configuration of a TDM pattern for partial access for communication with the network device.

Further, at 808 of the computer-implemented method 800, the network device can facilitate, a transmission, to the mobile device, of information indicative of the multiple TDM patterns (e.g., via the transmitter/receiver component 212). According to some implementations, prior to facilitating the transmission, the network device can select the multiple TDM patterns from a group of TDM patterns. To facilitate the transmission, in some implementations, the network device can establish a defined scheduling for the mobile device. Further, data for the mobile device is not scheduled during the off state.

Figure 9:
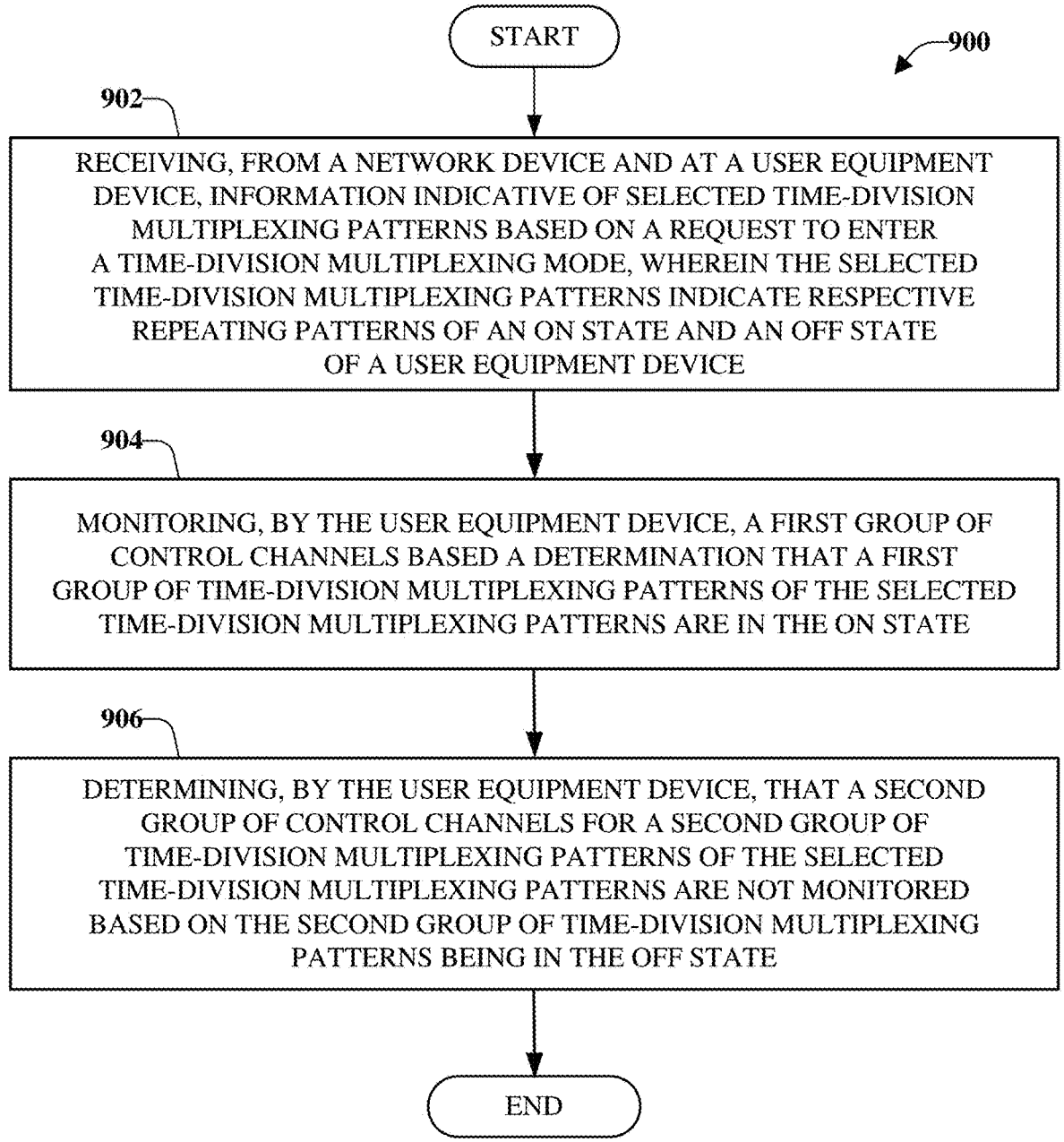
FIG. 9 illustrates a flow diagram of an example, non-limiting, computer-implemented method for operating in a time-division multiplexing mode in advanced networks in accordance with one or more embodiments described herein.

FIG. 9 illustrates a flow diagram of an example, non-limiting, computer-implemented method 900 for operating in a TDM mode in advanced networks in accordance with one or more embodiments described herein. Repetitive description of like elements employed in other embodiments described herein is omitted for sake of brevity.

In some implementations, a system comprising a processor can perform the computer-implemented method 900 and/or other methods discussed herein. In other implementations, a device comprising a processor can perform the computer-implemented method 900 and/or other methods discussed herein. In other implementations, a machine-readable storage medium, can comprise executable instructions that, when executed by a processor, facilitate performance of operations, which can be the operations discussed with respect to the computer-implemented method 900 and/or other methods discussed herein. In further implementations, a computer readable storage device comprising executable instructions that, in response to execution, cause a system comprising a processor to perform operations, which can be operations discussed with respect to the computer-implemented method 900 and/or other methods discussed herein.

At 902 of the computer-implemented method 900, a UE device can receive, from a network device, information indicative of selected TDM patterns (e.g., via the transmitter/receiver component 402). For example, the information can be received at the UE device based on a request (sent from the UE device to the network device) to enter a TDM mode. The request can be a message requesting configuration of a TDM pattern for partial access for communication with the network device. The selected TDM patterns can indicate respective repeating patterns of an on state and an off state of a user equipment device.

Further, at 904, the UE device can monitor a first group of control channels based on a determination that a first group of TDM patterns of the selected TDM patterns are in the on state (e.g., via the monitor component 408). The UE device can also, at 906, determine that a second group of control channels for a second group of TDM patterns of the selected TDM patterns are not monitored based on the second group of TDM patterns being in the off state (e.g., via the analysis component 410).

In an additional implementation, the UE device can send a first recommended TDM pattern to a first network device and a second recommended TDM pattern to a second network device. The first recommended TDM pattern and the second recommended TDM pattern are non-overlapping in a time domain.

Described herein are systems, methods, articles of manufacture, and other embodiments or implementations that can facilitate a TDM pattern-based solution for a dual-subscriber identity module with single radio in advanced networks. Accordingly, the disclosed aspects can support a dual-SIM single radio UE device to connect to both SIMs simultaneously (e.g., at substantially the same time, overlapping in time). No network coordination is required according to some implementations. The coordination of one or more TDM patterns is performed at the UE device side and recommended to the network (e.g., the network device).

Further, as discussed herein, there is no requirement on SFN alignment or even slot alignment between two networks (e.g., between two network devices). The UE device can calculate the timing offset between the UE device and the network (e.g., the network device) and adjust its recommended TDM pattern. The network can make the final decision on the TDM pattern. Thus, the network (e.g., at least one network device) is in full control.

Additionally, the UE device can be configured with multiple TDM patterns with dynamic switching. The network can dynamically adjust the ratio of "on" time. When heavy traffic or latency sensitive traffic arrives, the network can switch the UE device into always "on" mode or a TDM pattern with a high ratio of "on" time. The same idea can be used for scenario such as UE power saving.

Facilitating a TDM pattern-based solution for dual-subscriber identity module with a single radio can be implemented in connection with any type of device with a connection to the communications network (e.g., a mobile handset, a computer, a handheld device, etc.) any Internet of things (IoT) device (e.g., toaster, coffee maker, blinds, music players, speakers, water meter, etc.), and/or any connected vehicles (e.g., cars, airplanes, boats, space rockets, and/or other at least partially automated vehicles (e.g., drones), and so on). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

To meet the huge demand for data centric applications, 4G standards can be applied to 5G, also called New Radio (NR) access. The 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to Long Term Evolution (LTE).

Multiple Input, Multiple Output (MIMO) systems can significantly increase the data carrying capacity of wireless systems. For these reasons, MIMO is an integral part of the third and fourth generation wireless systems (e.g., 3G and 4G). In addition, 5G systems also employ MIMO systems, which are referred to as massive MIMO systems (e.g., hundreds of antennas at the transmitter side (e.g., network) and/receiver side (e.g., user equipment). With a $(N_t, N_r)$ system, where $N_t$ denotes the number of transmit antennas and $N_r$ denotes the receive antennas, the peak data rate multiplies with a factor of $N_t$ over single antenna systems in rich scattering environment.

In addition, advanced networks, such as a 5G network can be configured to provide more bandwidth than the bandwidth available in other networks (e.g., 4G network, 5G network). A 5G network can be configured to provide more ubiquitous connectivity. In addition, more potential of applications and services, such as connected infrastructure, wearable computers, autonomous driving, seamless virtual and augmented reality, "ultra-high-fidelity" virtual reality, and so on, can be provided with 5G networks. Such applications and/or services can consume a large amount of bandwidth. For example, some applications and/or services can consume about fifty times the bandwidth of a high-definition video stream, Internet of Everything (IoE), and others. Further, various applications can have different network performance requirements (e.g., latency requirements and so on).

Cloud Radio Access Networks (cRAN) can enable the implementation of concepts such as SDN and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., Internet protocol (IP), frame relay, asynchronous transfer mode (ATM) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks such as telephony network(s) 940 (e.g., public switched telephone network (PSTN), or public land mobile network (PLMN)) or a signaling system #7 (SS7) network 960. Circuit switched gateway node(s) 912 can authorize and authenticate traffic (e.g., voice) arising from such networks. Additionally, CS gateway node(s) 912 can access mobility, or roaming, data generated through SS7 network 960; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication. Mobile network platform 910 can also include the MMEs, HSS/PCRFs, SGWs, and PGWs disclosed herein.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 970 can embody, at least in part, a service network(s) such as IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format, and so on) such flows. Such application(s) can include add-on features to standard services (for example, provisioning, billing, user support, and so forth) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless network platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 970, or SS7 network 960. In an aspect, memory 930 can be, for example, accessed as part of a data store component or as a remotely connected memory store.

Figure 10:
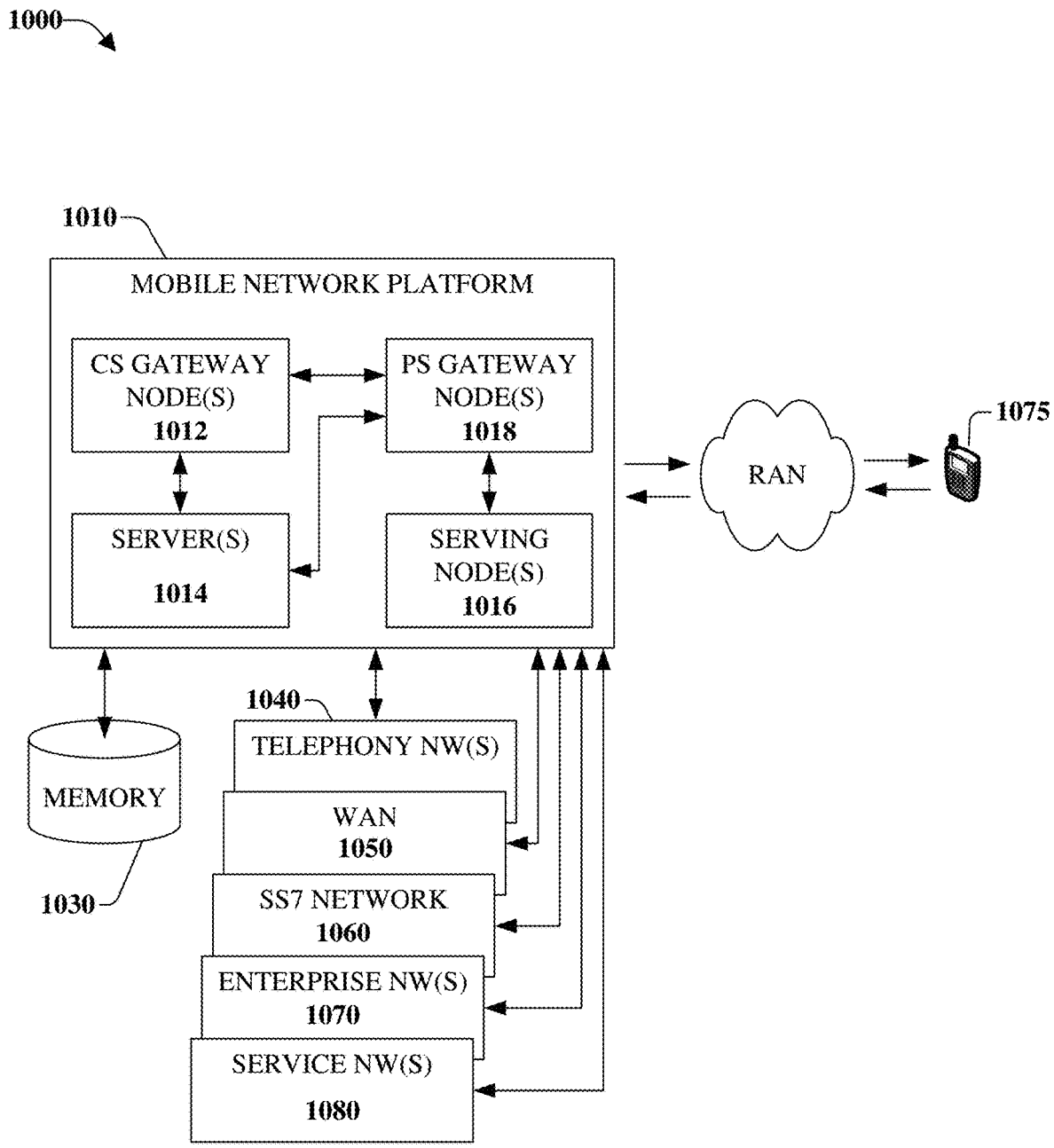
FIG. 10 illustrates an example block diagram of a non-limiting embodiment of a mobile network platform in accordance with various aspects described herein.
Figure 11:
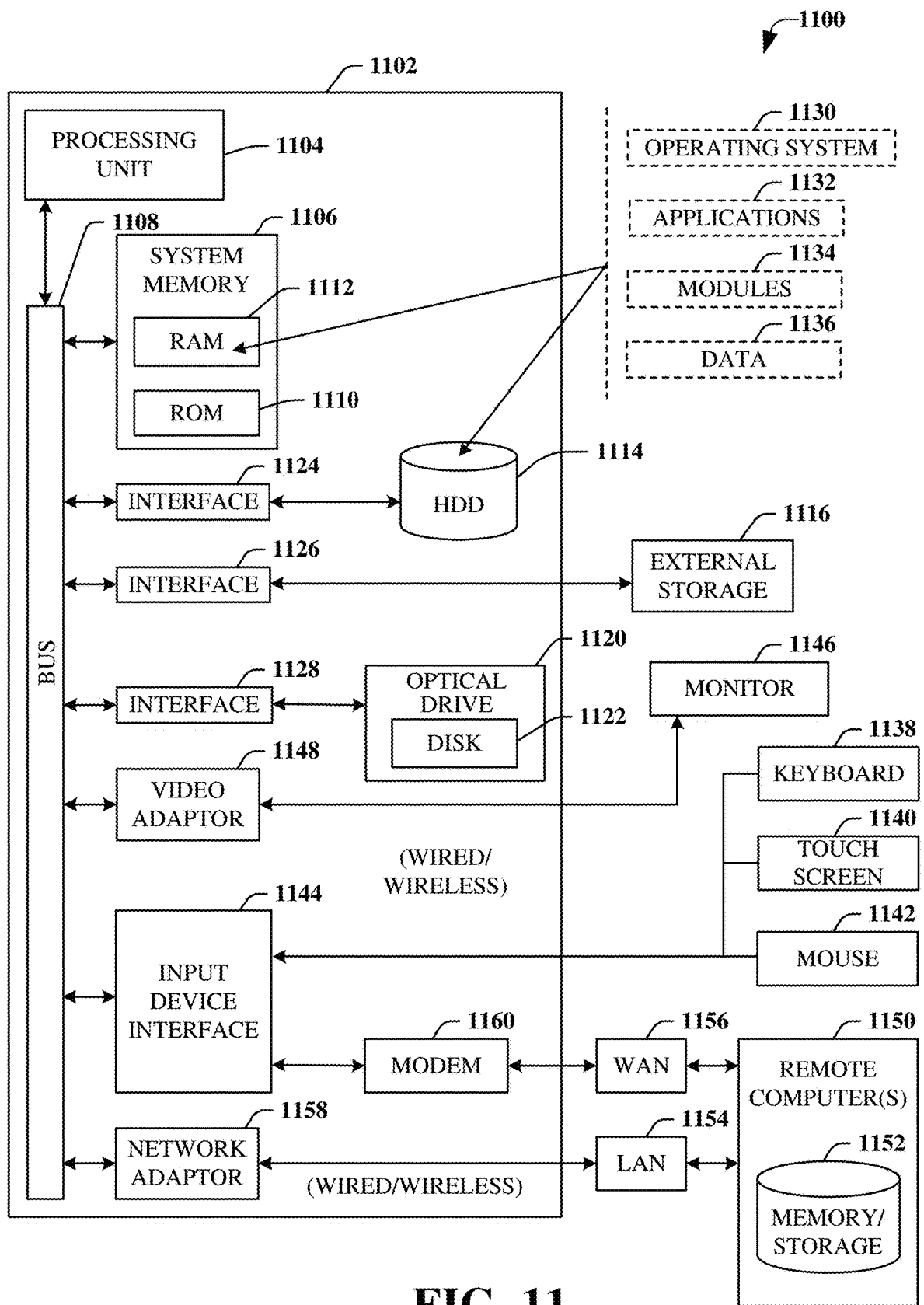
FIG. 11 illustrates an example block diagram of an example computer operable to engage in a system architecture that facilitates wireless communications according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 702.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 702.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example. Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable instructions that, when executed by the processor, facilitate performance of operations, comprising:
configuring multiple time-division multiplexing patterns for a user equipment device, resulting in multiple configured time-division multiplexing patterns, wherein the multiple configured time-division multiplexing patterns indicate respective repeating patterns of an on state and an off state of a defined identity of the user equipment device;
selecting a time-division multiplexing pattern from the multiple configured time-division multiplexing patterns, resulting in a selected time-division multiplexing pattern; and
sending information indicative of the selected time-division multiplexing pattern to the user equipment device, wherein the user equipment device is configured to operate with dual-subscriber identity modules.

2. The system of claim 1, wherein the respective repeating patterns comprise patterns that alternate between the on state and the off state.

3. The system of claim 1, wherein the selecting the time-division multiplexing pattern comprises deactivating time-division multiplexing patterns of the multiple configured time-division multiplexing patterns, excluding the selected time-division multiplexing pattern.

4. The system of claim 1, wherein the sending the information indicative of the selected time-division multiplexing pattern comprises establishing a defined scheduling for the user equipment device.

5. The system of claim 4, wherein the establishing the defined scheduling comprises:
scheduling downlink control information that comprises a field dedicated for the sending the information indicative of the selected time-division multiplexing pattern.

6. The system of claim 4, wherein the establishing the defined scheduling comprises:
configuring downlink control information with a defined fixed payload for selection of the time-division multiplexing pattern.

7. The system of claim 4, wherein the sending information indicative of the selected time-division multiplexing pattern comprises:
transmitting a reference signal comprising a defined sequence.

8. The system of claim 1, wherein the configuring the time-division multiplexing pattern comprises receiving, from the user equipment device, a request to enter a time-division multiplexing mode and a recommended time-division multiplexing pattern.

9. The system of claim 1, wherein the time-division multiplexing pattern is a periodic resource in a time domain.

10. A method, comprising:
  obtaining, by a network device comprising a processor, multiple time-division multiplexing patterns applicable to a mobile device, wherein the multiple time-division multiplexing patterns indicate respective repeating patterns of an on state and an off state of a defined identity of the mobile device; and
  facilitating, by the network device, a transmission, to the mobile device, of information indicative of the multiple time-division multiplexing patterns, wherein the mobile device is configured to operate with at least two subscriber identity modules.

11. The method of claim 10, further comprising:
  prior to the facilitating the transmission, selecting, by the network device, the multiple time-division multiplexing patterns from a group of time-division multiplexing patterns.

12. The method of claim 10, further comprising:
  prior to the obtaining the multiple time-division multiplexing patterns, receiving from the mobile device a request for configuration of a time-division multiplexing pattern for partial access for communication with the network device.

13. The method of claim 10, wherein the obtaining the multiple time-division multiplexing patterns comprises:
  activating at least one time-division multiplexing pattern of the multiple time-division multiplexing patterns; and
  deactivating other time-division multiplexing patterns of the multiple time-division multiplexing patterns, excluding the at least one time-division multiplexing pattern.

14. The method of claim 10, wherein the facilitating the transmission comprises establishing a defined scheduling for the mobile device, and wherein data for the mobile device is not scheduled during the off state.

15. The method of claim 10, wherein the facilitating the transmission of information indicative of the multiple time-division multiplexing patterns comprises transmitting a reference signal comprising a defined sequence.

16. The method of claim 10, wherein the multiple time-division multiplexing patterns are periodic resources in a time domain.

17. A non-transitory machine-readable storage medium, comprising executable instructions that, when executed by a processor, facilitate performance of operations, comprising:
  receiving, from a network device, information indicative of selected time-division multiplexing patterns based on a request to enter a time-division multiplexing mode, wherein the selected time-division multiplexing patterns indicate respective repeating patterns of an on state and an off state of a user equipment device; and
  monitoring a first group of control channels based on a determination that a first group of time-division multiplexing patterns of the selected time-division multiplexing patterns are in the on state.

18. The non-transitory machine-readable storage medium of claim 17, wherein the operations further comprise:
  determining that a second group of control channels for a second group of time-division multiplexing patterns of the selected time-division multiplexing patterns are not monitored based on the second group of time-division multiplexing patterns being in the off state.

19. The non-transitory machine-readable storage medium of claim 17, wherein the operations further comprise:
  prior to the receiving, sending, to the network device, a message requesting configuration of a time-division multiplexing pattern for partial access for communication with the network device.

20. The non-transitory machine-readable storage medium of claim 17, wherein the network device is a first network device, and wherein the operations further comprise:
  sending a first recommended time-division multiplexing pattern to the first network device and a second recommended time-division multiplexing pattern to a second network device, wherein the first recommended time-division multiplexing pattern and the second recommended time-division multiplexing pattern are non-overlapping in a time domain.

* * * * *